United States Patent
Gasson et al.

(10) Patent No.: US 10,888,775 B2
(45) Date of Patent: Jan. 12, 2021

(54) INTERACTIVE COMBAT GAMING SYSTEM

(71) Applicant: CHINA INDUSTRIES LIMITED, Wolverhampton (GB)

(72) Inventors: Mark Neil Gasson, Reading (GB); Graeme John Taylor, Much Wenlock (GB); James Edward Alexander Wyatt, Eastbourne (GB)

(73) Assignee: China Industries Limited, Wolverhampton (GB)

( * ) Notice: Subject to any disclaimer, the term of this patent is extended or adjusted under 35 U.S.C. 154(b) by 628 days.

(21) Appl. No.: 15/302,919

(22) PCT Filed: Apr. 8, 2015

(86) PCT No.: PCT/GB2015/051076
§ 371 (c)(1),
(2) Date: Oct. 7, 2016

(87) PCT Pub. No.: WO2015/155530
PCT Pub. Date: Oct. 15, 2015

(65) Prior Publication Data
US 2017/0028298 A1     Feb. 2, 2017

(30) Foreign Application Priority Data
Apr. 8, 2014   (GB) .................. 1406341.6

(51) Int. Cl.
*A63F 13/24*      (2014.01)
*A63F 13/235*    (2014.01)
(Continued)

(52) U.S. Cl.
CPC ............ *A63F 13/24* (2014.09); *A63F 13/211* (2014.09); *A63F 13/235* (2014.09); *A63F 13/25* (2014.09); *A63F 13/285* (2014.09); *A63F 13/54* (2014.09)

(58) Field of Classification Search
CPC ........ A63F 13/21; A63F 13/235; A63F 13/24; A63F 13/25; A63F 13/54; A63F 13/212; A63F 13/428; A63F 13/833
(Continued)

(56) References Cited

U.S. PATENT DOCUMENTS 5,314,371 A  *  5/1994  Mason ..................... A63H 5/00
                                                                        446/397
6,144,367 A     11/2000  Berstis
(Continued)

FOREIGN PATENT DOCUMENTS

EP           867798 A2    9/1998
JP       2002200339 A     7/2002
(Continued)

OTHER PUBLICATIONS

International Search Report and Written Opinion dated Jul. 8, 2015 from International Patent Application No. PCT/GB2015/051076 filed Apr. 8, 2015.
(Continued)

*Primary Examiner* — Michael A Cuff
(74) *Attorney, Agent, or Firm* — David B. Tingey; Bryant J. Keller; Kirton McConkie (57) ABSTRACT

A controller for use in an interactive gaming system is described. The controller comprising a player mounting means, a motion detector that provides a means for determining the motion of the controller and an audio code communication module. The audio code communication module provides a means for generating an audio code signal in response to a detected, predetermined motion of the controller. The audio code signals for the controller can be embedded within normal audio output of a gaming system and thereafter be employed to activate a multitude of features within the games. The gaming system may comprise an
(Continued)

opponent based on an electronic game running on a computer device or a second controller worn by a second player. The gaming system may further comprise one or more power up toys that provide additional combat moves for the one or more participants.

2 Claims, 6 Drawing Sheets

(51) Int. Cl.
    *A63F 13/54*     (2014.01)
    *A63F 13/211*     (2014.01)
    *A63F 13/25*     (2014.01)
    *A63F 13/285*     (2014.01)

(58) Field of Classification Search
    USPC .......................................................... 463/31
    See application file for complete search history.

(56) References Cited

U.S. PATENT DOCUMENTS

| | | | | |
|---|---|---|---|---|
| 7,444,353 | B1* | 10/2008 | Chen | G06F 16/683 |
| 7,922,557 | B2* | 4/2011 | Fearon | A63H 5/00 |
| | | | | 446/397 |
| 2002/0151337 | A1* | 10/2002 | Yamashita | A63F 13/06 |
| | | | | 463/8 |
| 2004/0264713 | A1 | 12/2004 | Grzesek | |
| 2007/0111779 | A1 | 5/2007 | Osnato | |
| 2009/0093307 | A1 | 4/2009 | Miyaki | |
| 2009/0259325 | A1* | 10/2009 | Topchy | G10L 19/06 |
| | | | | 700/94 |
| 2010/0063813 | A1 | 3/2010 | Richter et al. | |
| 2010/0280641 | A1* | 11/2010 | Harkness | H04H 20/31 |
| | | | | 700/94 |
| 2010/0306685 | A1* | 12/2010 | Giaimo, III | A63F 13/67 |
| | | | | 715/765 |
| 2011/0025542 | A1 | 2/2011 | Mo | |
| 2011/0077065 | A1 | 3/2011 | Sandoval et al. | |
| 2011/0081969 | A1 | 4/2011 | Ikeda | |
| 2011/0190068 | A1* | 8/2011 | Powers | A63G 13/06 |
| | | | | 472/98 |
| 2012/0309261 | A1 | 12/2012 | Boman et al. | |
| 2014/0235347 | A1* | 8/2014 | Zhang | A63F 13/00 |
| | | | | 463/35 |
| 2015/0168538 | A1* | 6/2015 | Bradley | G01S 5/18 |
| | | | | 367/127 |
| 2016/0084605 | A1* | 3/2016 | Monti | A63F 13/837 |
| | | | | 463/2 |
| 2016/0258758 | A1* | 9/2016 | Houston | G01C 21/20 |
| 2019/0122698 | A1* | 4/2019 | Iyer | G06F 16/686 |

FOREIGN PATENT DOCUMENTS

| | | |
|---|---|---|
| JP | 2002200339 A2 | 7/2002 |
| WO | 2004084190 A2 | 9/2004 |

OTHER PUBLICATIONS

International Preliminary Report on Patentability dated Oct. 12, 2016 from International Patent Application No. PCT/GB2015/051076 filed Apr. 8, 2015.

* cited by examiner

INTERACTIVE COMBAT GAMING SYSTEM

The present invention relates to the field of interactive toys and playthings. In particular, an interactive combat gaming system is described that provides a means for one or more players to take part in non-contact combat.

BACKGROUND TO THE INVENTION

Paintball and laser tag are two examples of interactive combat gaming systems known in the art.

Paintball involves players competing, individually or in teams, to eliminate opponents by tagging them with capsules containing water soluble dye (referred to as paintballs) propelled from a device called a paintball marker (commonly referred to as a paintball gun). Games can be played in indoor or outdoor arenas of varying sizes. An arena is typically scattered with natural or artificial terrain, which players can use for tactical cover. Because of the velocity at which the paintball gun can project the paintballs all players are required to wear masks or goggles at all times on the arena. Even with these safety measures there exists a significant risk of pain and injury for the players taking part.

Paintball games can also result in the staining of the players' clothes and exposed areas of skin.

A cleaner, lower risk alternative to paintball is laser tag. Laser tag games again employ the use hand guns but instead of projecting paintballs to tag a target these guns emit a laser and an infrared signal tracker. The visible laser is only used for targeting and effect, and in an indoor area it is the infrared tracker that relays information every time the laser is fired. This information can then be collected by a central computer which allocates hits to the player who fired the laser and hits a target. Targets typically comprise infrared receivers carried by the other players participating in the game.

It is an object of an embodiment of the present invention to provide an alternative interactive combat gaming system which obviates or mitigates one or more drawbacks or disadvantages of the above described prior art.

SUMMARY OF THE INVENTION

According to a first aspect of the present invention there is provided a controller for use in an interactive gaming system the controller comprising a player mounting means, a motion detector that provides a means for determining the motion of the controller and an audio code communication module wherein the audio code communication module provides a means for generating an audio code signal in response to a detected, predetermined motion of the controller.

The controller allows audio codes to be generated in response to predetermined moves performed by the player e.g. combat moves performed by the movement of a player's arms or legs. Audio code technology is a robust but cost effective technology which usually operates at or above the normal high frequency range easily heard by humans. This has the advantage that it allows the communication signals for the controller to be embedded within normal audio output of a gaming system and thereafter be employed to activate a multitude of features within the games.

The controller may comprise one or more connection sockets. The connection sockets provide a means for hard-wiring other components to the controller.

Preferably the generated audio code signal is emitted wirelessly from the controller.

The player mounting means may comprise a mounting means selected from a group comprising a wrist cuff, a glove, a leg brace and an ankle brace.

Preferably the motion detector comprises a linear acceleration sensor and a microprocessor. The microprocessor may be configured to operate as an internal state machine for the controller. The employment of the internal state machine improves the determination of the motion of the controller.

Most preferably the audio code communication module provides a means for the controller to receive audio code signals.

The audio code communication module may comprise an audio codec module, an audio code speaker and an audio code detector (e.g. a microphone).

Most preferably the controller further comprises one or more speakers. The speakers provide a means for the controller to generate sound in response to the predetermined detected motion.

Preferably the controller further comprises one or more visual displays. The visual displays may comprise one or more lights and or one or more display panels. The visual displays provide a means for the controller to generate visual output in response to the predetermined detected motion.

The controller may comprise one or more wireless communication modules. The wireless communication modules provide a means for wireless communication with other components of a gaming system.

Optionally the one or more wireless communication modules comprise an infrared communication module. Alternatively, the one or more wireless communication modules comprise a radio wave module.

The controller may comprise one or more operation activation means. The one or more operation activation means may comprise a mechanical, optical or capacitive switch.

The controller may comprise one or more vibrators. The one or more vibrators may be connected to the controller via one or more connection sockets. The one or more vibrators provide a means for providing a vibration-responsive game.

According to a second aspect of the present invention there is provided an interactive combat gaming system for a first player the combat gaming system comprising one or more controllers in accordance with the first aspect of the present invention.

Optionally the gaming system further comprises an opponent for the first player generated by an electronic game running on a computer device.

Alternatively, the gaming system further comprises an opponent for the first player comprising a robot. In the present invention the term robot refers to hardware that comprises a second audio code communication module and optionally a second wireless communication module e.g. an infrared communication module and or a radio wave module.

In a yet further alternative the gaming system comprises an opponent for the first player comprising one or more controllers in accordance with the first aspect of the invention located on a second player.

Most preferably the gaming system further comprises one or more power up toys that provide additional combat moves for the one or more controllers.

The power up toys may comprise an electrical circuit the resistance or impedance of which defines an impedance code. The impedance code provides a means for identifying the power up toy. Such a power up toy is preferably connected to the computer device by a toy interface.

Alternatively the power up toys may comprise a third audio code communication module configured to generate a power up audio code signal in response to the detection of a predetermined audio code signal.

Preferably the generated power up audio code signal is emitted wirelessly from the power up toy.

The predetermined audio code signal may be generated by a controller.

Alternatively, the predetermined audio code signal may be generated by the electronic game running on the computer device.

In a yet further alternative the predetermined audio code signal may be generated by the robot.

Optionally, the predetermined audio code signal is generated by a television or on-line television or on-line broadcast. The predetermined audio code signals may be stored on a media storage e.g. disc, memory stick etc.

The power up toys may comprise figural toys or non-figural toys.

Embodiments of the second aspect of the invention may include one or more features of the first aspect of the invention or its embodiments, or vice versa.

According to a third aspect of the present invention there is provided a method of generating an audio code signal from a controller the method comprising:
  determining a first motion of the controller;
  comparing the determined first motion of the controller with a first predefined set of one or more combat moves;
  generating an audio code signal when the determined first motion matches one of the combat moves of the first predefined set.

Most preferably the generated audio code signal comprises a unique audio code signal assigned to the one or more combat moves.

Preferably the generated audio code signal is emitted wirelessly.

The method may further comprise:
  determining a second motion of the controller;
  comparing the determined second motion of the controller with a second predefined set of one or more combat moves.

Embodiments of the third aspect of the present invention may comprise features to implement the preferred or optional features of the first or second aspects of the invention or vice versa.

According to a fourth aspect of the present invention there is provided a method of interactive combating with an opponent the method comprising generating one or more audio code signals from a controller.

Most preferably the method of generating one or more audio code signals from a controller comprises the method in accordance with the third aspect of the invention.

The method may further comprise generating one or more second signals from the controller. The one or more second signals may comprise an infrared signal or a radio wave signal.

Preferably the method further comprises receiving one or more power up for the controller in response to the one or more generated audio codes.

Embodiments of the fourth aspect of the present invention may comprise features to implement the preferred or optional features of the first to third aspects of the invention or vice versa.

BRIEF DESCRIPTION OF THE DRAWINGS

There will now be described, by way of example only, various embodiments of the invention with reference to the drawings, of which.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION OF PREFERRED EMBODIMENTS

Figure 1:
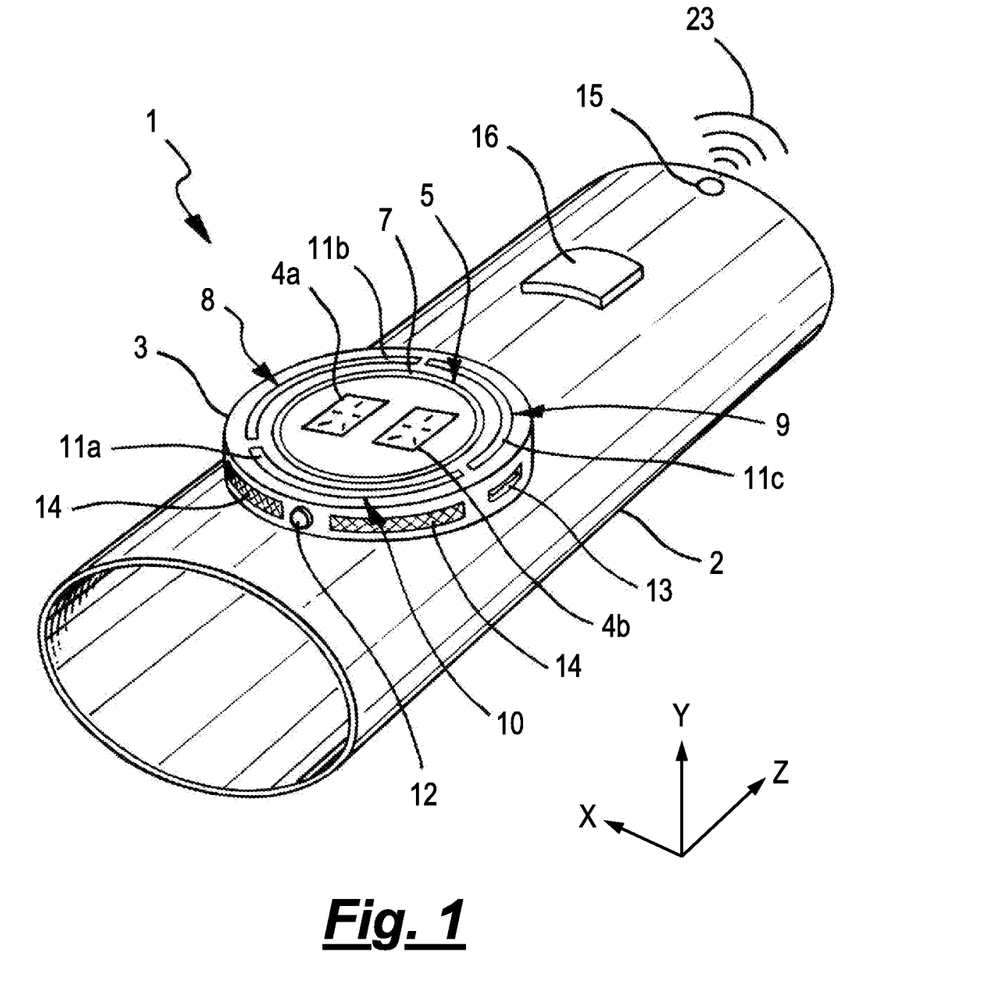
FIG. 1 presents an isometric view of a controller in accordance with an embodiment of the present invention.
Figure 2:
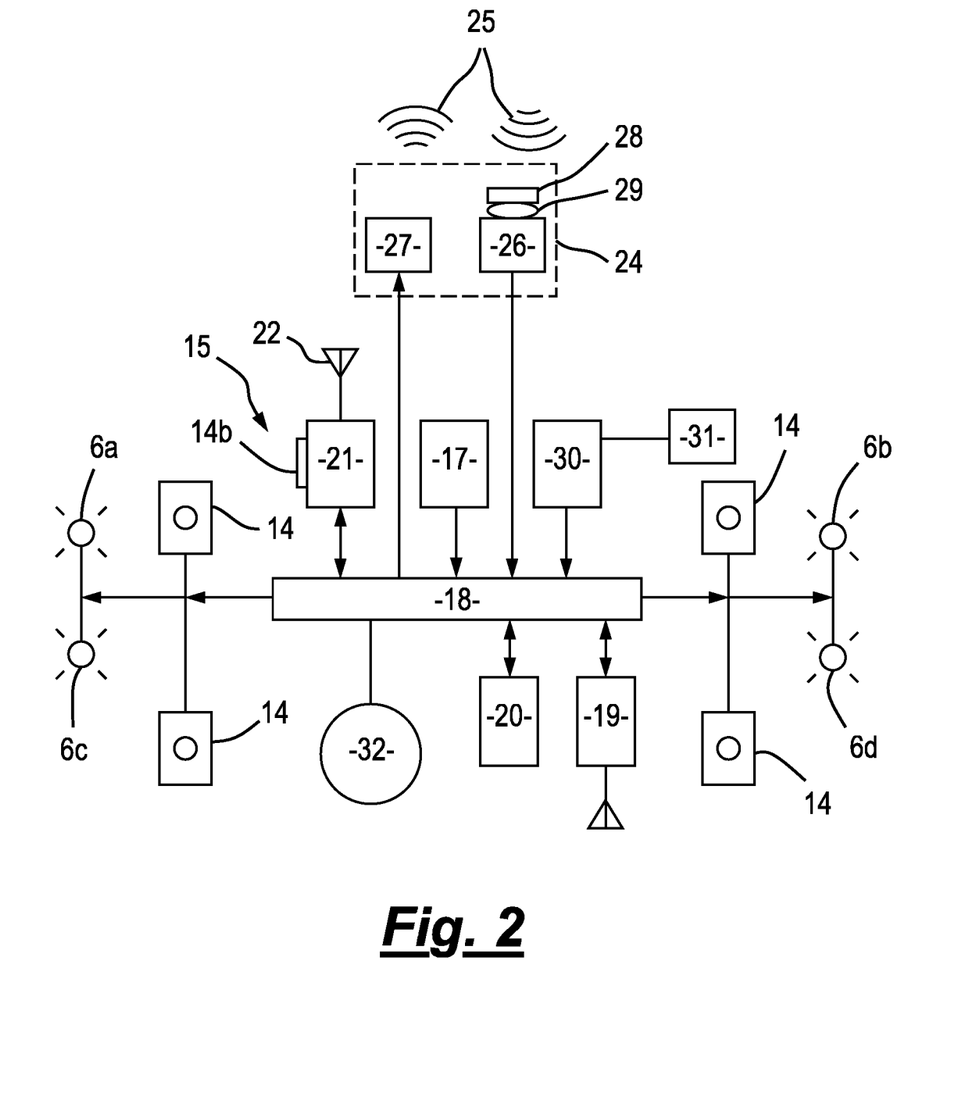
FIG. 2 presents a block diagram illustrating a structure of the controller of FIG. 1.

A description of a controller 1 for use within an interactive combat gaming system in accordance with an embodiment of the present invention will now be described with reference to FIGS. 1 and 2. In particular FIG. 1 presents an isometric view of the controller 1 as seen from the top rear side thereof, while FIG. 2 presents a block diagram representation of the controller 1.

The controller 1 can be seen to comprise a mounting means in the form of a wrist cuff 2 attached to which is disk-shaped housing 3 formed by plastic moulding or the like. In use, it is intended that a player puts on the wrist cuff 2 such that the disk-shaped housing 3 locates on top of their wrist area. It will however be appreciated by the skilled reader that the wrist cuff 2 mounting means could be worn in a different manner, or be replaced by a glove or even a leg or ankle brace.

On the top surface of the housing 3 are located two display panels 4a and 4b. The display panels 4a and 4b may be seven segment LED displays and may be employed during game play to display a range of gaming parameters e.g. health, powering up of weapons etc.

Surrounding the display panels 4a and 4b is a first light 5. The first light 5 comprises an LED 6a that is optically coupled to a circular light guide 7. The circular light guide 7 is arranged such that the display panels 4a and 4b are located centrally within its perimeter.

Located outside of the perimeter of the first light 5 are three further lights 8, 9 and 10. Each of the second 8, third 9 and fourth lights 10 comprises an LED 6b, 6c, 6d that is optically coupled to an arc-shaped light guide 11a, 11b and 11c, respectively. The arc-shaped light guides 11a, 11b and 11c are all arranged to be concentric with the circular light guide 7.

Various components of the controller 1 can be seen to be located on the side face of the housing 3. These components include a number of operation buttons 12 (only one of which is shown in FIG. 1) a connection socket 13, and four speakers 14 (only two of which are shown in FIG. 1). The connection socket 13 may be a USB socket or 32-pin edge connector and is employed to provide a means for engaging and connecting the controller 1 with a connection cable (not shown) so as to allow the controller 1 to be hardwired to a separate component of the gaming system (as described in further detail below).

A transmitter and receiving means 15 (further details of which are described below) is located on the top surface of the wrist cuff 2 so as to define a distal end of the controller 1.

A second operation button 16 can also be seen on the top surface of the wrist cuff 2, located between the housing 3 and the transmitter and receiving unit 15. The operation buttons 12 and or the second operation button 16 may comprise a mechanical, optical or capacitive switch.

In order to assist with the following specific description, a coordinate system for the controller 1 is presented in FIG. 1. Specifically, the longitudinal direction of the wrist cuff 2, i.e. the front-rear direction of the controller 1, is set as a Z-axis direction. A direction towards the distal end of the controller 1 is set as a positive Z-axis direction. The up-to-down direction of the controller 1 is set as a Y-axis direction. A direction towards the housing 3 of the controller 1 is set as a positive Y-axis direction. The left-right direction of the controller 1 is set as an X-axis direction. A direction toward a left side of the positive Z-axis direction is set as a positive X-axis direction.

Further details of the components of the controller 1 can be seen in FIG. 2. The controller 1 preferably comprises a motion detector that includes a three-axis, linear acceleration sensor 17 that detects linear acceleration in three directions, i.e., the up/down direction (Y-axis shown in FIG. 1), the left/right direction (X-axis shown in FIG. 1), and the forward/backward direction (Z-axis shown in FIG. 1). Alternatively, a two axis linear accelerometer that only detects linear acceleration along each of the X-axis and Y-axis (or other pair of axes) may be used in another embodiment depending on the type of control signals desired. Preferably, the acceleration sensor 17 is an electrostatic capacitance or capacitance-coupling type that is based on silicon micromachined MEMS technology. However, any other suitable accelerometer technology (e.g., piezoelectric type, piezoresistance type or a mechanical weight based type, as described in U.S. Pat. No. 8,461,468 B2) may be used to provide the three-axis or two-axis linear acceleration sensor 17.

As is known to those skilled in the art, the linear acceleration sensor 17 is capable of detecting acceleration along a straight line corresponding to each axis of the acceleration sensor 17 i.e. the direct output of the acceleration sensor 17 is limited to signals indicative of linear acceleration (static or dynamic) along each of the two or three axes thereof. However, as is also known in the art, further processing of the output signals from the acceleration sensor 17 provides a means for the acceleration sensor 17 to detect movement along a non-linear (e.g. arcuate) path, rotation, rotational movement, angular displacement, tilt, position, attitude or any other physical movement of the controller 1. In the presently described embodiment the processing is done within a microcomputer 18 although it will be appreciated by the skilled reader that this process could easily be relayed to an external CPU for processing e.g. via a wireless communication module 19. Thus the combination of the acceleration sensor 17 and the microcomputer 18 provide a means for determining the precise movement of the controller 1. This information may be stored with a dedicated memory unit 20 during processing.

The controller 1 further comprises various other communication modules. The first communication module is the previously mentioned transmitter and receiving means 15 which in the presently described embodiment is in the form of an audio code communication module comprising an audio codec module 21 connected to a speaker 14*b* a microphone 22 and the microcomputer 18. The audio codec module 21 provides a means for encoding analogue audio as a digital signal and decoding digital signals back to into analogue. When combined with the speaker 14*b* and the microphone 22 the audio codec module 21 provides a means for the controller 1 to transmit and receive audio code signals, as represented by reference numeral 23. The generated audio code signals have a frequency in the range of 16 kHz-24 kHz i.e. above that normally able to be easily heard by the game players. In the presently described embodiments the audio code signals are generated at a frequency of 17.2-18.8 kHz.

Another communication module comprises the speakers 14. In the presently described embodiment there are four speakers, connected to the microcomputer 18. The speakers 14 provide a means for the controller 1 to emit sound in the 20 Hz to 16 kHz frequency range i.e. the normal easily heard frequency range for the game players.

In a similar manner the microcomputer 18 can be seen to control the output of the LEDs 6*a*, 6*b*, 6*c* and 6*d*.

The controller 1 may also comprise an infrared communication module 24. This module 24 provides the controller with the means to transmit and receive infrared signals, as generally depicted by reference numeral 25. In particular, the infrared communication module 24 comprises an infrared detector 26 and an infrared transmitter 27, both of which are connected to the microcomputer 18. In an alternative embodiment, the infrared detector 26 communicates with the microcomputer 18 via the wireless communication module 19. In such an embodiment the infrared detector 26 can be located outside of the housing 3 and thus mounted elsewhere on the player e.g. on a shoulder mount or on a chest plate. In a yet further alternative embodiment, the externally mounted infrared detector 26 could be hardwired to the microcomputer 18 via the connection socket 13.

The infrared detector 26 may be a solid-state imaging device such as a photo diode or a photo transistor. An infrared filter 28, and optionally a lens 29, are located at the distal end of the infrared detector 26 so as to provide a means to allow only infrared light to be incident upon the infrared detector 26. Accordingly, the infrared detector 26 detects an image of only the infrared light which has passed through the infrared filter 28 and generates image data. The image data generated by the infrared detector 26 is then processed by the microcomputer 18.

The infrared transmitter 27 may comprises an infrared LED or diode laser. The microcomputer 18 provides a means for encoding the infrared signal 25 generated by the infrared transmitter 27 which then propagates from the controller 1.

An operation module 30 connected to the microcomputer 18 is also presented in FIG. 2. This component represents the interaction of the operation buttons 12 and 16 with the rest of the controller 1. For example, the first operation button 12 may be assigned the function of powering up and down the controller 1 by selectively connecting a power source 31 to the microcomputer 18. When the second operation button 16 is activated this is indicative of a player placing their hand on the top of the wrist cuff 2. This may allow additional combat moves to be accessed by the player, as described in further detail below.

A vibrator 32 attached to the microcomputer 18 is also located within the housing 3. The vibrator 32 may be, for example, a vibration motor or a solenoid. The controller 1 can therefore be vibrated by an actuation of the vibrator 32, and the vibration is conveyed to the player wearing the controller 1. Thus, a so-called vibration-responsive game can be realised. In an alternative embodiment, the vibrator 32 may communicate with the microcomputer 18 via the wireless communication module 19. In such an embodiment the vibrator 32 can be located outside of the housing 3 and thus mounted elsewhere on the player e.g. on a chest plate. In a yet further alternative embodiment, the externally mounted vibrator 32 could be hardwired to the microcomputer 18 via the connection socket 13.

Interactive Combat Gaming Systems

A first gaming system, depicted generally by reference numeral 33 in FIG. 3, will now be described. This gaming system 33 can be seen to comprise the controller 1 worn by a player 34 which is intended to interact with software that is running on a computer device via audio code signals 23. The software may for example be an electronic game run on a computer 35 e.g. a desk top computer, a laptop computer, a tablet device, a palm top device or a mobile phone device.

The gaming system 33 further comprises three power up a figural toys which fall into two distinct types: a basic power up toy 36 and deluxe power up toys 37 and 38.

The basic power up toy 36 incorporates a simple electrical circuit 39 having a known resistance or impedance which defines an impedance code. The electrical circuit 39 may for example comprise a single resistor or a resistor-capacitor combination. The impedance code thus provides a means for identifying the basic power up toy 36. The basic power up toy 36 requires a toy interface 40 to allow it to be connected to the computer 35. The toy interface 40 is employed to pass a current through the electrical circuit 39 so as to provide a means for identifying the model of figural toy 36 present i.e. the measured current is directly dependent on the inherent resistance or impedance. This information is passed to the electronic game which then transmits an associated audio code signal 23 so as to announce the presence of the particular basic power up toy 36 to the other components of the gaming system 33.

The deluxe power up toys 37 and 38 differ from the basic power up toy 36 in that they contain their own power source 41, microcomputer 42, audio code communications module 21*b* and so are capable of directly transmitting and receiving audio codes. Therefore, the deluxe power up toys 37 and 38 do not require to be connected to the computer 35 in order for their presence to be announced to the remaining components of the gaming system 33.

Figure 4:
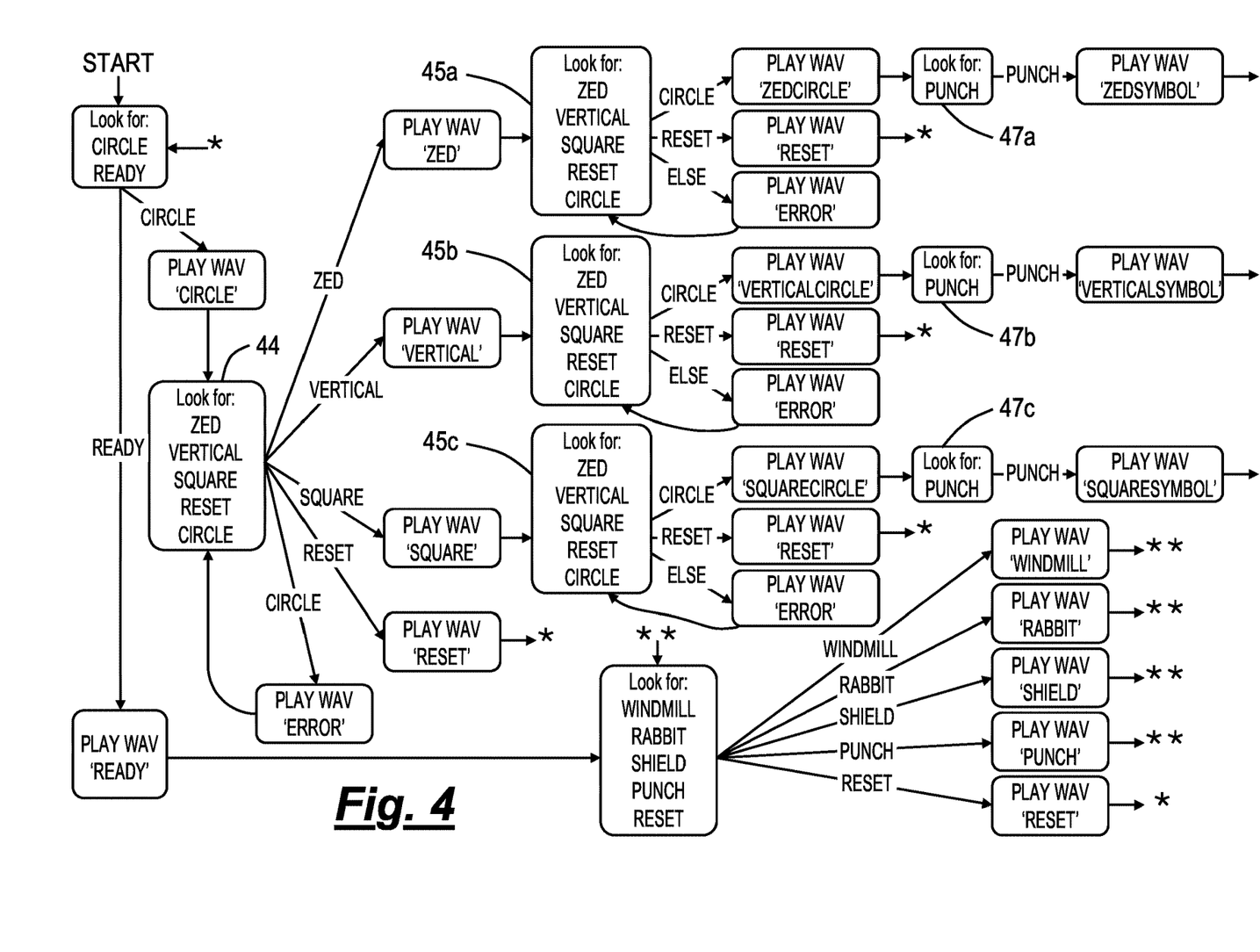
FIG. 4 presents a state machine diagram outlining the method of play for the interactive combat gaming system of FIG. 3.

The operation of the first gaming system 33 will now be described with reference to the state machine diagram of FIG. 4.

The first state (designated by a single asterisk '*') for the controller 1 occurs once it has been powered up, typically by activating operation button 12. The speakers 14 may play a sound way at this time indicative of the "powered up" state of the controller 1 and or the controller 1 may emit an audio code signal 23 so as announce the presence of the controller 1 to the rest of components of the gaming system 33. While in this first state '*' the controller 1 is looking for a 1 "ready to fight" symbol or a "power up" symbol to be made by the motion of the controller 1.

In order to commence interactive combat the player 34 must activate the "ready to fight" symbol e.g. by making the controller 1 move in a rapid up and down motion by making a punching action into the air. At this stage the speakers 14 may play a sound way indicative of the "ready to fight" state of the controller 1 and or the controller 1 may emit an audio code signal 23 so as to activate a fight mode within the electronic game running on the computer 35. The lights 5, 8, 9 and 10 may also be activate in a pre-programmed display.

The controller 1 then moves to a combat state (designated by a double asterisk '') where it is looking for a combat move selected from a first predefined set of combat moves to be performed by the player 34. In the presently described embodiment this predefined set of combat moves comprises a WINDMILL, RABBIT, SHIELD, PUNCH or RESET move. By way of example only, the player 34 may choose to move their arm in the form of a large circular motion e.g. a WINDMILL attack. The combination of the acceleration sensor 17 and the microcomputer 18 allows the controller 1 to recognise this motion and thus generate an audio code signal 23 representative of this attack. The controller 1 then moves on to the next state where an audio code signal 23 representative of this attack is transmitted from the controller 1. At this time the speakers 14 may also play a sound way indicative of this particular attack and or the lights 5, 8, 9 and 10 may be activate in a pre-programmed display. The controller then returns to the combat state '' where it looks for the next combat action of the player 34.

If the audio code signal 23 representative of this attack is incident on the computer 35, then the electronic game reacts as appropriate to such an attack. The electronic game will also be generating its own attacks and transmitting an associated audio code signal 43 in a similar manner to that described above. If the audio code signal 43 transmitted by the computer 35 is incident upon the antenna 22 of the controller 1 then the appropriate action is taken by the microcomputer 18 e.g. the speakers 14 play a sound way indicative of this particular attack; the lights 5, 8, 9 and 10 may be caused to flash in a particular sequence; the display panels 4*a* and 4*b* may also be updated to show the present health of the player.

It will be appreciated by the skilled reader that the amount of energy contained within an combat motion may depend on the particular motion involved and be of a predetermined value. Typically combat motions that take longer to perform, and thus are harder to execute, are rewarded with a higher attack level. There may also be a power regeneration time such that the time between combat motions dictates how much energy is available for that next attack. In addition, one or more combat motions may simply act as a shield to protect the player against an opponent's attack. The one or more of the shield motions may be employed to deflect an attack onto another player or to even reflect the attack back on the opponent from whom it was originally generated.

The interactive combat continues as detailed above until the player 34 is either victorious or defeated. The speakers 14 may then play a sound way indicative of this result. The player can return to the first state '*' at any time during a battle, or subsequent to a battle, by moving the controller 1 through the predetermined RESET motion e.g. a move right to left followed by a move left to right.

Before moving to the combat state '' a player 34 may choose to activate a power up provided in the presently described embodiment by one of the power up toys 36, 37 or 38. This is achieved by the player activating the "power up" symbol e.g. by moving the controller 1 in a circular motion. At this stage the speakers 14 may play a sound way indicative of the "looking for a power up" state of the controller 1, the controller 1 may emit an audio code signal 23 so as to activate the power up toys 36, 37 or 38 present within the gaming system 33 and or the lights 5, 8, 9 and 10** may be activated in a pre-programmed display.

The controller 1 is then in a first power up state 44 where it is looking for a combat move selected from a second predefined set of combat moves to be performed by the player 34. The second predefined set of combat moves may comprise a ZED, VERTICAL, SQUARE, RESET of CIRCLE motion of the controller 1. If the player 34 then moves the controller 1 in the required sequence they will be able to access the power up provided by the power up toys 36, 37 or 38 provided that it is presently available within the gaming system 33.

By way of example only, the presently described gaming system 33 requires three separate motions of the controller 1 in order to obtain a desired power up.

The first involves the player 34 choosing to move the controller 1 in a ZED, VERTICAL or SQUARE motion in order to move the controller 1 from the first power up state 44 to one of three, second power up states 45a, 45b or 45c. At this stage the speakers 14 may play a sound way indicative of the ZED, VERTICAL or SQUARE motion, the controller 1 may emit an audio code signal 23 so as to alert the respective power up toy 36, 37 or 38 that it may need to transmit a response audio code signal 46 and or the lights 5, 8, 9 and 10 may be activated in a pre-programmed display.

Once in the second power up states 45a, 45b or 45c the controller 1 is again looking for a combat move selected from a second predefined set of combat moves to be performed by the player 34. In the presently described embodiment the controller 1 is only able to move on to the next state if the player 34 performs a CIRCLE motion upon the comptroller 1. If the controller detects the CIRCLE motion then it moves on to one of three, third power up states 47a, 47b or 47c. The speakers 14 may play a sound way indicative of the CIRCLE motion, and or the controller 1 may emit an audio code signal 23 so as to alert the respective power up toy 36, 37 or 38 that it may need to transmit a response audio code signal 46, and or the lights 5, 8, 9 and 10 may be activated in a pre-programmed display. If the CIRCLE motion is not completed correctly then the controller 1 remains in the second power up states 45a, 45b or 45c and the speakers 14 may play a sound way inductive of the ERROR.

The third motion required to obtain the desired power up is for the player 34 to move the controller along the positive Z-axis by performing a horizontal punch i.e. they are expected to punch through the circle created while in the second power up states 45a, 45b or 45c. If this motion is successfully carried out then the controller 1 emits an audio code signal 23 to the respective power up toy 36, 37 or 38 instructing it to provide its power up function to the player 34. The power up function is provided by the power up toy 36, 37 or 38 through the transmission of the power up toy's audio code 46, for deluxe toys 37 or 38, or through the computer audio code 43 for the basic power up toy 36. The power up may take the form of increased attack strength, increased health for the player, new attacks moves or the opening of new features within the electronic game, to name but a few examples.

The player 34 can again return to the first state '*' at any time during the "power up" states by again moving the controller 1 through the predetermined RESET motion e.g. a move right to left followed by a move left to right.

Figure 3:
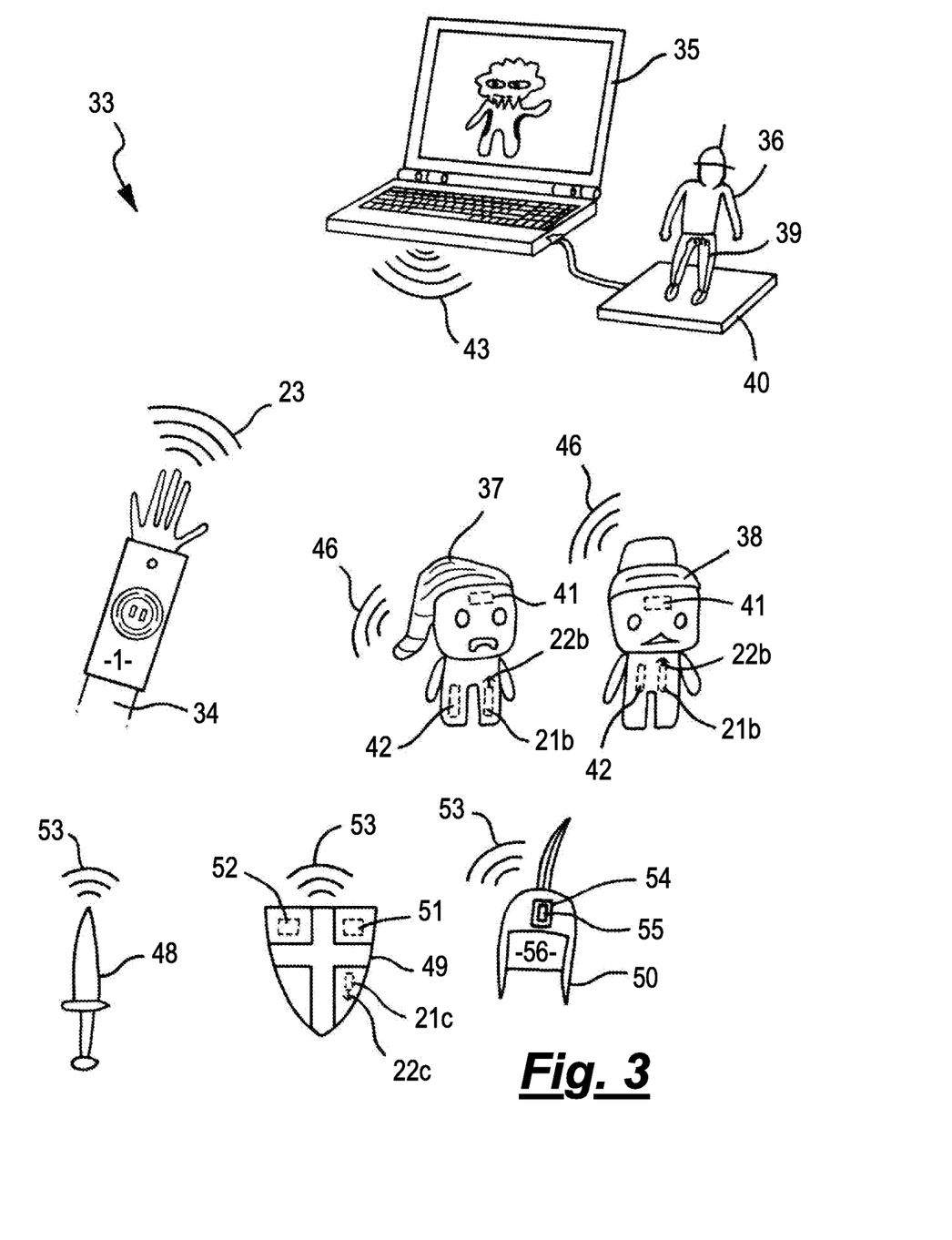
FIG. 3 presents a schematic representation of a first interactive combat gaming system in accordance with an embodiment of the present invention.

The gaming system 33 may comprise other additional non-figural power up toys presented schematically in FIG. 3. For example, a play weapon 48 in the form of a sword, a shield 49 and a helmet 50 are shown. Like the deluxe power up toys 37 and 38, these components 48, 49 and 50 preferably comprises a power source 51, microcomputer 52, audio communications module 21c and so are capable of directly transmitting and receiving audio codes 53. The non-figural power up toys 48, 49 and 50 can therefore communicate wirelessly with the controller 1. Alternatively, one or more of these components 48, 49 and 50 could be hardwired to the controller via the connection socket 13.

As will be appreciated by the skilled reader the sword 48, shield 49 and helmet 50 may be employed to increase the playing features of the gaming system 33. For example, the sword may allow for increased attacks for the player 34 while the shield 49 and or the helmet 50 may offer increased health to a player 34.

In addition, the helmet 50 may further comprise a mobile device cradle 54 suitable for receiving a mobile device 55 e.g. a mobile phone. The mobile device cradle 54 is arranged such that the mobile device 55 can be employed to provide a heads up display (HUD) on a visor or transparent screen 56 of the helmet 50. This may be achieved via an app running on the mobile device 55. The app may also allow the mobile device 55 to provide an alternative communication means for the gaming system 33 e.g. between two players 34 both wearing a helmet 50 with a mobile device 55 mounted thereon.

One or more of the above described additional combat components 48, 49 and 50 may further comprise lights and or speakers so as to provide alternative sources of audio and visual content for the gaming system 33.

Figure 5:
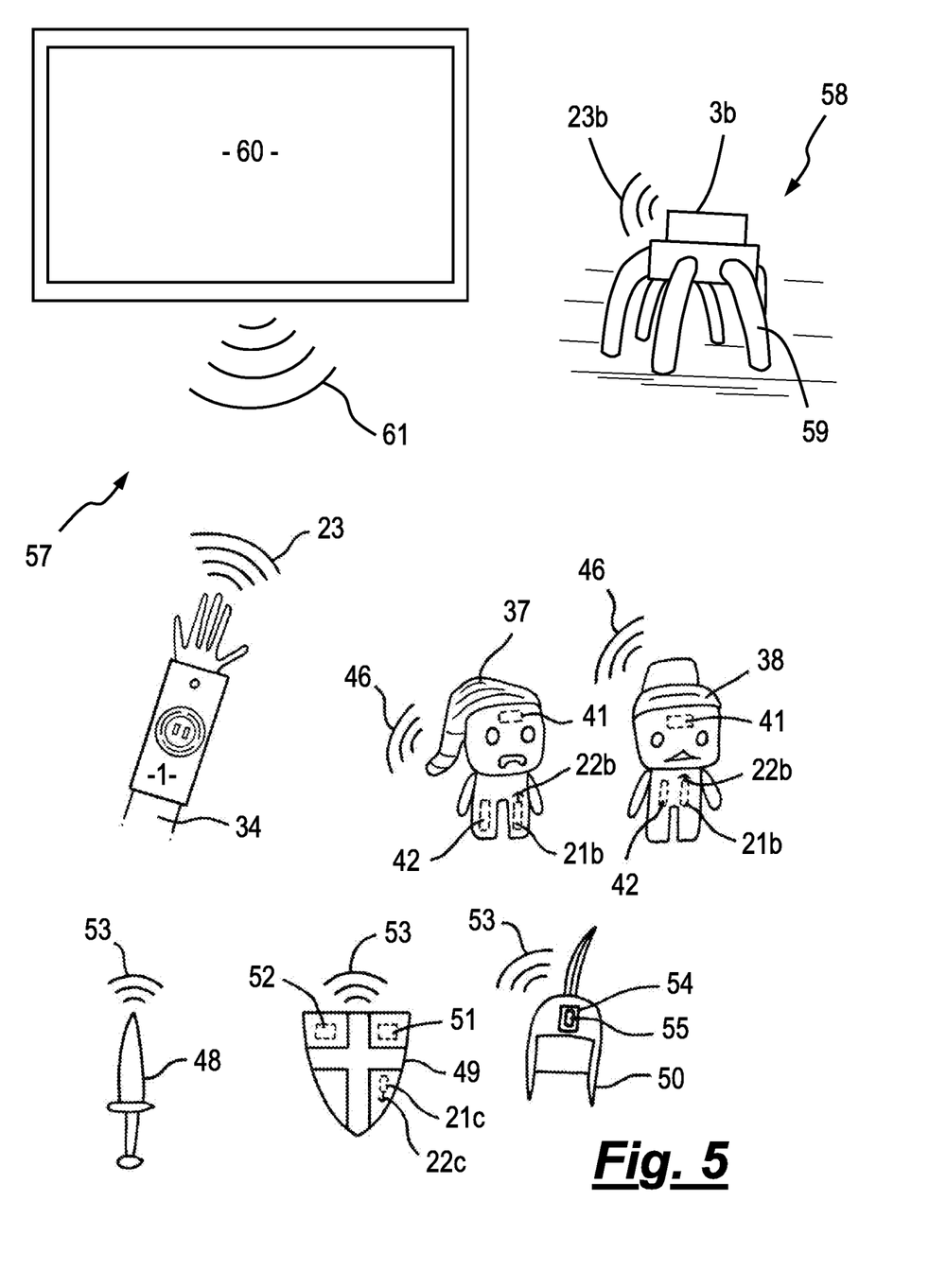
FIG. 5 presents a schematic representation of a second interactive combat gaming system in accordance with an embodiment of the present invention.

A second interactive combat gaming system, depicted generally by reference numeral 57 in FIG. 5, will now be described. This gaming system 57 can be seen to comprise many of the components describe above with relation to the first gaming system 33 of FIG. 3 and therefore the same components have been depicted with the same reference numerals. However, in the second gaming system 57, the computer device 35 has been replaced with a robot type opponent, depicted generally by reference numeral 58. The term robot refers generally to hardware that comprises a second audio code communication module and optionally a second wireless communication module e.g. an infrared communication module and or a radio wave module. In the presently described embodiment, the robot 58 comprises a housing 3b similar to that described in detail above with respect to the controller 1. As a result the player 34 wearing the controller 1 is able to combat interactively with the robot 58 via audio code signals 23 in a similar manner to that described above with respect to the software running on the computer device 35. This embodiment has the advantage that it is more flexible to deploy. In addition, the robot 58 may comprise movement means 59, e.g. a walking mechanism as described in UK patent number GB 2,484,352 B and so can move independently of the player 34, thus adding to the overall gaming experience.

The gaming system 57 may be further adapted to work with a television or on-line broadcast, as depicted generally by reference numeral 60. The television or on-line broadcast may be in the form of a children's programme having normal video and audio but in the presently described embodiment the television or on-line audio further comprises an audio code signal 61. The audio code signal 61 can again be employed to add to the overall gaming experience by allowing predetermined events within the TV programme to influence the interactive combat, for example:

1) To make the one or more of the power up toys 36, 37 or 38 respond to the broadcast e.g. flashing lights, generating sound or movement; or
2) To make one or more of the additional combat components e.g. the weapon 48, shield 49 or helmet 50 to respond to the broadcast e.g. flashing lights or generating sound.

Figure 6:
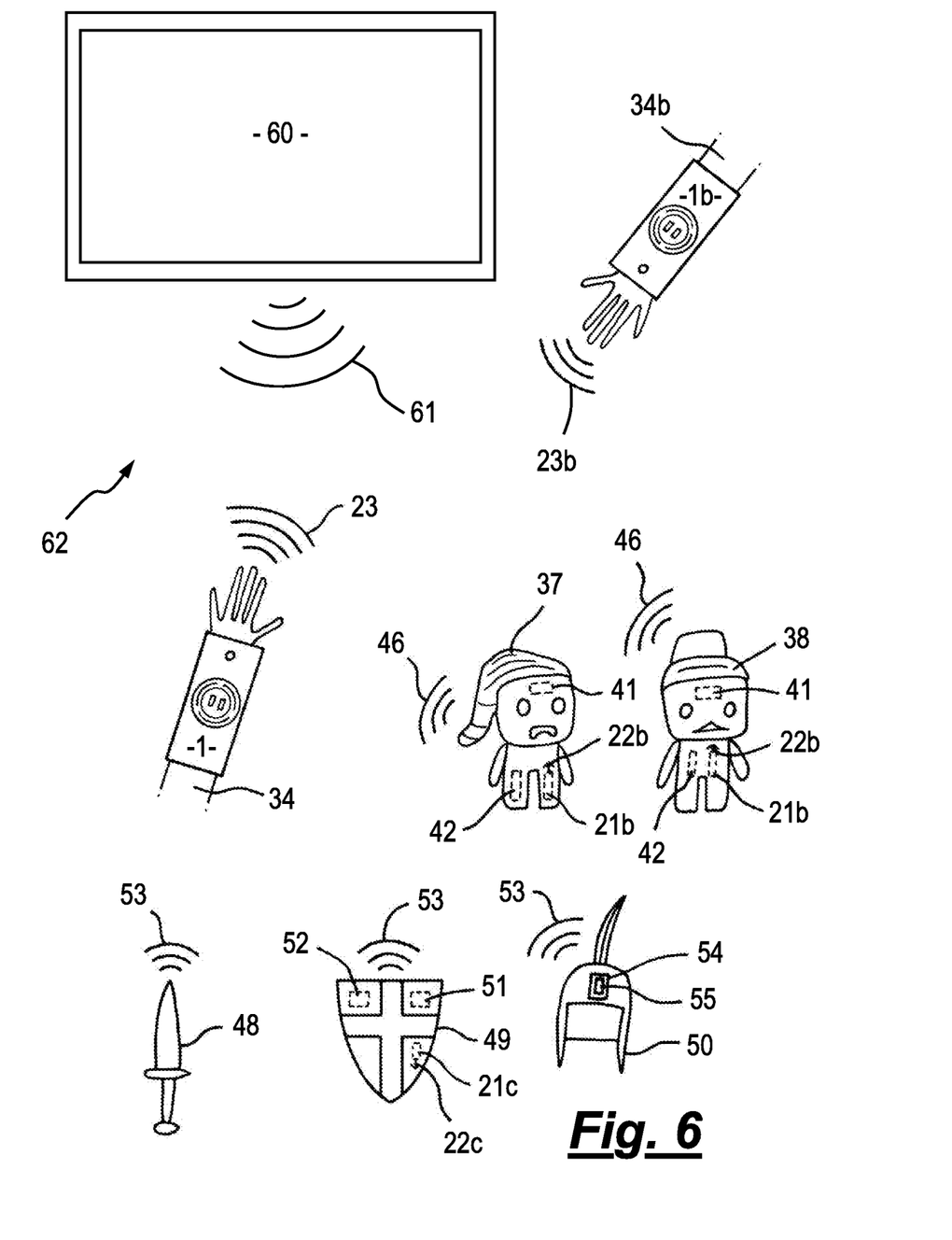
FIG. 6 presents a schematic representation of a third interactive combat gaming system in accordance with an embodiment of the present invention.

3) Providing the player 34 or robot 58 with an additional power up or combat handicap;
4) Removing from the player 34 the facility of a power up toy 36, 37 or 38; or
5) Removing from the player 34 the facility of one of the additional add components e.g. the weapon 48, shield 49 or helmet 50;

A third interactive combat gaming system, depicted generally by reference numeral 62 in FIG. 6, will now be described. This gaming system 62 can be seen to comprise many of the components describe above with relation to the first gaming system 33 of FIG. 3 and the second gaming system 57 of FIG. 5, therefore the same components have been depicted with the same reference numerals. However, in this gaming system 57, combat opponent is a second player 34b wearing a second combat controller 1b. As a result the player 34 wearing the controller 1 is able to combat interactively with the second player 34 wearing the second controller 1b. In order to facilitate the interactive combat it is preferable for the direct communication between the controllers 1 and 1b to be performed by the infrared communication modules 24 and 24b.

The interactive combat gaming system described above offer a number of advantages over those described in the prior art. The first advantage resides in the fact that the primary communication means between the various components of the gaming systems is based on audio code signals. Audio code technology is a robust but cost effective technology which operates above the normal frequency range for human hearing. This allows the communication signals to be embedded within normal audio output of the gaming system and thereafter be employed to activate a multitude of features within the games. This arrangement means the gaming systems are extremely flexible. For example the described technology can be employed with gaming software adapted to run on stranded computer devices and games consoles, with bespoke stand alone components e.g. combat robots and with traditional broadcasting technology e.g. traditional television or on-line broadcasts that have been adapted to include audio code signals.

The described motion sensitive controllers can also be employed within person to person interactive combat games where predetermined combat motions performed by the players activate associated attacks and or defense moves. This significantly increases the game play options when compared with traditional paintball and laser tag gaming systems.

The audio code based technology also provides an ideal means for the described gaming systems to incorporate additional components e.g. power up toys, armour and weapons.

A controller for use in an interactive gaming system is described. The controller comprising a player mounting means, a motion detector that provides a means for determining the motion of the controller and an audio code communication module. The audio code communication module provides a means for generating an audio code signal in response to a detected, predetermined motion of the controller. The audio code signals for the controller can be embedded within normal audio output of a gaming system and thereafter be employed to activate a multitude of features within the games. The gaming system may comprise an opponent based on an electronic game running on a computer device or a second controller worn by a second player. The gaming system may further comprise one or more power up toys that provide additional combat moves for the one or more participants.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A method of generating an audio code signal from a controller suitable for use in an interactive gaming system, the method comprising:
   employing a player mounting means to allow the controller to be worn by a player;
   employing a motion detector and a microprocessor within the controller to provide a means for determining a motion of the controller;
   employing an audio code communication module within the controller comprising an audio codec module connected to a speaker and a microphone, to provide a means for the controller to transmit and receive audio code signals,
   determining a first motion of the controller worn by the player;
   comparing the determined first motion of the controller with a first predefined set of one or more combat moves;
   generating an audio code signal when the determined first motion matches one of the combat moves of the first predefined set, wherein the generated audio code signal comprises a unique audio code signal assigned to the one or more combat moves; and
   wirelessly emitting the generated audio code signal, wherein the generated audio code signal is adapted to be embedded within normal audio output by operating above a normal frequency range for human hearing.

2. The method of generating the audio code signal from the controller as claimed in claim 1, wherein the method further comprises:
   determining a second motion of the controller; and
   comparing the determined second motion of the controller with a second predefined set of one or more combat moves.

* * * * *